United States Patent
Bhogal et al.

(10) Patent No.: US 10,310,964 B2
(45) Date of Patent: *Jun. 4, 2019

(54) SYSTEM AND METHOD FOR DETERMINING RELEVANCE OF APPLICATION SOFTWARE MAINTENANCE

(71) Applicant: International Business Machines Corporation, Armonk, NY (US)

(72) Inventors: Kulvir S. Bhogal, Forth Worth, TX (US); Samir A. Nasser, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,812

(22) Filed: Jul. 18, 2017

(65) Prior Publication Data

US 2017/0344458 A1     Nov. 30, 2017

Related U.S. Application Data

(63) Continuation of application No. 14/831,318, filed on Aug. 20, 2015, now Pat. No. 9,772,926.

(51) Int. Cl.
| | |
|---|---|
| G06F 9/44 | (2018.01) |
| G06F 11/36 | (2006.01) |
| G06F 8/41 | (2018.01) |

(52) U.S. Cl.
CPC ............ *G06F 11/3636* (2013.01); *G06F 8/41* (2013.01); *G06F 11/3604* (2013.01)

(58) Field of Classification Search
CPC ..... G06F 11/3636; G06F 11/3604; G06F 8/41

(Continued)

(56) References Cited

U.S. PATENT DOCUMENTS

| 8,025,195 B2 | 9/2011 | Robichaux et al. |
| 8,423,993 B2 | 4/2013 | Faus et al. |

(Continued)

OTHER PUBLICATIONS http://docs.oracle.com/cd/E18727_01/doc.121/e12148/T531058T531063.htm, Oracle E-Business Suite Patching Procedures, pp. 1-17, Apr. 17, 2015.

(Continued)

*Primary Examiner* — Anna C Deng
(74) *Attorney, Agent, or Firm* — Brian J. Colandreo, Esq.; Jeffrey T. Placker, Esq.; Holland & Knight LLP

(57) ABSTRACT

A method and computer system for compiling, by a computing device, a list of hosting software classes included in the hosting software fix pack when a fix is available. An execution path of each application hosted on a hosting software may be recorded. The execution path may be stored in a data store for each application. It may be determined which operations of each application interact with the hosting software. The operations of each application used at runtime that interact with the hosting software may be stored, including storing invoked hosting software operations and classes used by the operations of each application. The invoked hosting software operations and classes may be compared with corresponding operations and classes provided in the list included in the hosting software fix pack. A list of each intersection of the comparison for each application impacted by the hosting software fix pack may be generated.

8 Claims, 7 Drawing Sheets

(58) Field of Classification Search
USPC .......................................................... 717/128
See application file for complete search history.

(56) References Cited

U.S. PATENT DOCUMENTS

| | | | |
|---|---|---|---|
| 2005/0138151 A1* | 6/2005 | Lam .................... | G06F 9/44505 709/220 |
| 2005/0203955 A1* | 9/2005 | Ramaswamy .......... | G06F 8/433 |
| 2006/0117310 A1* | 6/2006 | Daniels .................. | G06F 8/658 717/168 |
| 2007/0011330 A1* | 1/2007 | Dinker ................ | G06F 11/3409 709/226 |
| 2009/0133033 A1 | 5/2009 | Lindo et al. | |
| 2009/0164407 A1* | 6/2009 | Voegele ............. | G06F 11/3466 706/52 |
| 2009/0204949 A1 | 8/2009 | Howland et al. | |
| 2010/0057905 A1 | 3/2010 | Enscoe et al. | |
| 2010/0235823 A1* | 9/2010 | Garbers .................... | G06F 8/71 717/170 |
| 2011/0083126 A1 | 4/2011 | Bhakta et al. | |
| 2013/0055228 A1 | 2/2013 | Song et al. | |
| 2013/0227533 A1 | 8/2013 | Tonkin et al. | |
| 2014/0013317 A1 | 1/2014 | Nose et al. | |
| 2014/0137184 A1 | 5/2014 | Russello et al. | |
| 2016/0062955 A1 | 3/2016 | Maertens et al. | |
| 2016/0224329 A1* | 8/2016 | Whitney ............. | G06F 9/44505 |
| 2017/0052875 A1 | 2/2017 | Bhogal et al. | |

OTHER PUBLICATIONS

Souppaya et al., "Guide to Enterprise Patch Management Technologies", National Institute of Standards and Technology, NIST Special Publication 800-40, Revision 3; 26 pages, Jul. 2013.

Flexera Software, "Analyzing the Impact of Installing a Microsoft Operating System Patch", 2016.

Hajmoosaei et al., "Towards a Change-Aware Process Environment for System and Software Process," 2015.

Ignat et al., "Soft-Error Classification and Impact Analysis on Real-Time Operating Systems," 2006.

IBM Patent Applications Listing for Patent Applications to Be Treated as Related, filed Jul. 18, 2017, pp. 1-2.

* cited by examiner

| Class | Checksum |
|---|---|
| package1.class1 | 123 |

| Method | Checksum |
|---|---|
| package1.class1.method1 | 456 |

FIG. 6

SYSTEM AND METHOD FOR DETERMINING RELEVANCE OF APPLICATION SOFTWARE MAINTENANCE

RELATED APPLICATIONS

The subject application is a continuation application of U.S. patent application Ser. No. 14/831,318, filed on Aug. 20, 2015, the entire contents of which are herein incorporated by reference.

BACKGROUND

Some example software, such as WebSphere Application Server, may be designed to host and run applications (e.g., business applications). These applications may manifest technical problems that may be caused by the hosting software itself. The lifecycle of the hosting software may often involve many major and minor fixes to various problems.

Customers of the hosting software may be required to apply a given fix in some test environments and run various tests before applying the fix in production. For example, a customer may be told to apply some fix to address a particular application problem. However, if the customer is not having a particular issue with an application, they may be reluctant to apply a fix pack to the hosting software because they may worry about having to perform regression-testing for all applications running in that host. These activities may be time-consuming and may cause customer satisfaction issues if the fix is irrelevant to a particular application problem. Additionally, some customers may run their applications in a hosting software that has fallen out of support. It may be beneficial to determine whether a fix applied to the hosting software is relevant to the application problem used by the customer.

BRIEF SUMMARY OF DISCLOSURE

In one example implementation, a method, performed by one or more computing devices, may include but is not limited to, compiling, by a computing device, a list of hosting software classes included in the hosting software fix pack when a fix is available. An execution path of each application hosted on a hosting software may be recorded. The execution path may be stored in a data store for each application. It may be determined which operations of each application interact with the hosting software. The operations of each application used at runtime that interact with the hosting software may be stored, including storing invoked hosting software operations and classes used by the operations of each application. The invoked hosting software operations and classes used by the operations of each application may be compared with corresponding operations and classes provided in the list included in the hosting software fix pack. A list of each intersection of the comparison for each application impacted by the hosting software fix pack may be generated.

One or more of the following example features may be included. Determining which operations of each application interact with the hosting software may include generating a checksum for each of the hosting software operations. Determining which operations of each application interact with the hosting software may include generating a checksum for each of the hosting software classes. Comparing the list of hosting software classes to the operations of each application that interact with the hosting software may include comparing the checksum for each of the hosting software operations with corresponding checksums provided in the list included in the hosting software fix pack. Comparing the list of hosting software classes to the operations of each application that interact with the hosting software may include comparing the checksum for each of the hosting software classes with corresponding checksums provided in the list included in the hosting software fix pack. The execution path may include a map of each method and corresponding execution path. The execution path may include a map of each class and corresponding checksum.

In another example implementation, a computing system includes a processor and a memory configured to perform operations that may include but are not limited to, compiling a list of hosting software classes included in the hosting software fix pack when a fix is available. An execution path of each application hosted on a hosting software may be recorded. The execution path may be stored in a data store for each application. It may be determined which operations of each application interact with the hosting software. The operations of each application used at runtime that interact with the hosting software may be stored, including storing invoked hosting software operations and classes used by the operations of each application. The invoked hosting software operations and classes used by the operations of each application may be compared with corresponding operations and classes provided in the list included in the hosting software fix pack. A list of each intersection of the comparison for each application impacted by the hosting software fix pack may be generated.

One or more of the following example features may be included. Determining which operations of each application interact with the hosting software may include generating a checksum for each of the hosting software operations. Determining which operations of each application interact with the hosting software may include generating a checksum for each of the hosting software classes. Comparing the list of hosting software classes to the operations of each application that interact with the hosting software may include comparing the checksum for each of the hosting software operations with corresponding checksums provided in the list included in the hosting software fix pack. Comparing the list of hosting software classes to the operations of each application that interact with the hosting software may include comparing the checksum for each of the hosting software classes with corresponding checksums provided in the list included in the hosting software fix pack. The execution path may include a map of each method and corresponding execution path. The execution path may include a map of each class and corresponding checksum.

In another example implementation, a computer program product resides on a computer readable storage medium that has a plurality of instructions stored on it. When executed by a processor, the instructions cause the processor to perform operations that may include but are not limited to, compiling a list of hosting software classes included in the hosting software fix pack when a fix is available. An execution path of each application hosted on a hosting software may be recorded. The execution path may be stored in a data store for each application. It may be determined which operations of each application interact with the hosting software. The operations of each application used at runtime that interact with the hosting software may be stored, including storing invoked hosting software operations and classes used by the operations of each application. The invoked hosting software operations and classes used by the operations of each application may be compared with corresponding operations and classes provided in the list included in the hosting software fix pack. A list of each intersection of the comparison for each application impacted by the hosting software fix pack may be generated.

One or more of the following example features may be included. Determining which operations of each application interact with the hosting software may include generating a checksum for each of the hosting software operations. Determining which operations of each application interact with the hosting software may include generating a checksum for each of the hosting software classes. Comparing the list of hosting software classes to the operations of each application that interact with the hosting software may include comparing the checksum for each of the hosting software operations with corresponding checksums provided in the list included in the hosting software fix pack. Comparing the list of hosting software classes to the operations of each application that interact with the hosting software may include comparing the checksum for each of the hosting software classes with corresponding checksums provided in the list included in the hosting software fix pack. The execution path may include a map of each method and corresponding execution path. The execution path may include a map of each class and corresponding checksum.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 6 is an example correspondence of methods, classes and checksums for execution paths according to one or more example implementations of the disclosure.

Like reference symbols in the various drawings indicate like elements.

DETAILED DESCRIPTION

Figure 1:
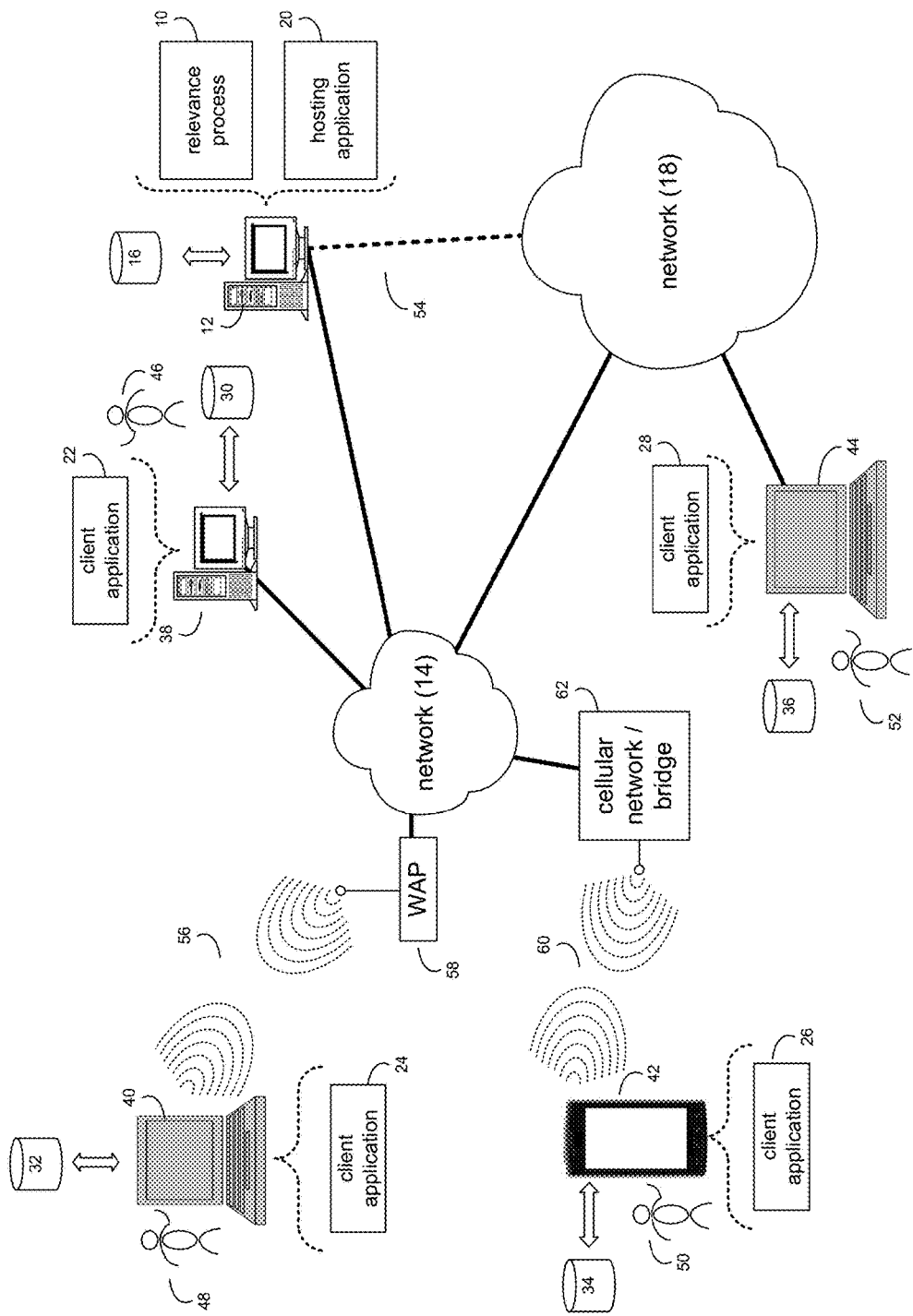
FIG. 1 is an example diagrammatic view of a relevance process coupled to a distributed computing network according to one or more example implementations of the disclosure.

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown relevance process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, relevance process 10 may, compile, by a computing device, a list of hosting software classes included in the hosting software fix pack when a fix is available. An execution path of each application hosted on a hosting software may be recorded. The execution path may be stored in a data store for each application. It may be determined which operations of each application interact with the hosting software. The operations of each application used at runtime that interact with the hosting software may be stored, including storing invoked hosting software operations and classes used by the operations of each application. The invoked hosting software operations and classes used by the operations of each application may be compared with corresponding operations and classes provided in the list included in the hosting software fix pack. A list of each intersection of the comparison for each application impacted by the hosting software fix pack may be generated.

The instruction sets and subroutines of relevance process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. Relevance process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a hosting application (e.g., hosting application 20), examples of which may include, but are not limited to, e.g., WebSphere Application Server, or other application that allows for the hosting of and running of applications (e.g., business applications). Relevance process 10 and/or hosting application 20 may be accessed via client applications 22, 24, 26, 28. Relevance process 10 may be a stand alone application, or may be an applet/application/script/extension that may interact with and/or be executed within hosting application 20, a component of hosting application 20, and/or one or more of client applications 22, 24, 26, 28. Hosting application 20 may be a stand alone application, or may be an applet/application/script/ extension that may interact with and/or be executed within relevance process 10, a component of relevance process 10, and/or one or more of client applications 22, 24, 26, 28. One or more of client applications 22, 24, 26, 28 may be a stand alone application, or may be an applet/application/script/ extension that may interact with and/or be executed within and/or be a component of relevance process 10 and/or hosting application 20. Examples of client applications 22, 24, 26, 28 may include, but are not limited to, e.g., WebSphere Application Server, or other application that allows for the hosting of and running of applications (e.g., business applications), a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of relevance process 10 (and vice versa). Accordingly, relevance process 10 may be a purely server-side application, a purely client-side application, or a hybrid server-side/client-side application that is cooperatively executed by one or more of client applications 22, 24, 26, 28 and/or relevance process 10.

One or more of client applications 22, 24, 26, 28 may be configured to effectuate some or all of the functionality of hosting application 20 (and vice versa). Accordingly, hosting application 20 may be a purely server-side application, a purely client-side application, or a hybrid server-side/client-side application that is cooperatively executed by one or more of client applications 22, 24, 26, 28 and/or hosting application 20. As one or more of client applications 22, 24, 26, 28, relevance process 10, and hosting application 20, taken singly or in any combination, may effectuate some or all of the same functionality, any description of effectuating such functionality via one or more of client applications 22, 24, 26, 28, relevance process 10, hosting application 20, or combination thereof, and any described interaction(s) between one or more of client applications 22, 24, 26, 28, relevance process 10, hosting application 20, or combination thereof to effectuate such functionality, should be taken as an example only and not to limit the scope of the disclosure.

Users 46, 48, 50, 52 may access computer 12 and relevance process 10 (e.g., using one or more of client electronic devices 38, 40, 42, 44) directly through network 14 or through secondary network 18. Further, computer 12 may be connected to network 14 through secondary network 18, as illustrated with phantom link line 54. Relevance process 10 may include one or more user interfaces, such as browsers and textual or graphical user interfaces, through which users 46, 48, 50, 52 may access relevance process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth® (including Bluetooth® Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth® (including Bluetooth® Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
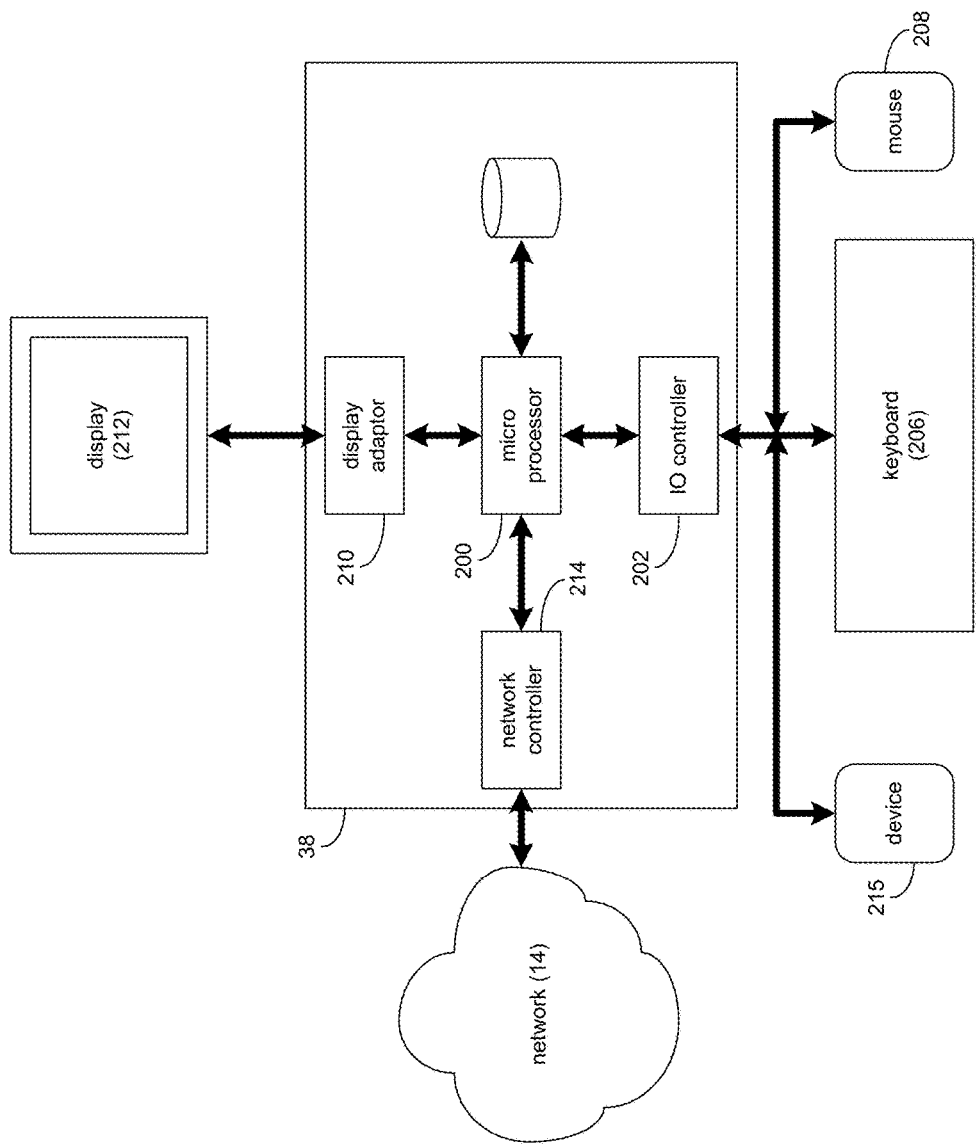
FIG. 2 is an example diagrammatic view of a client electronic device of FIG. 1 according to one or more example implementations of the disclosure.
Figure 3:
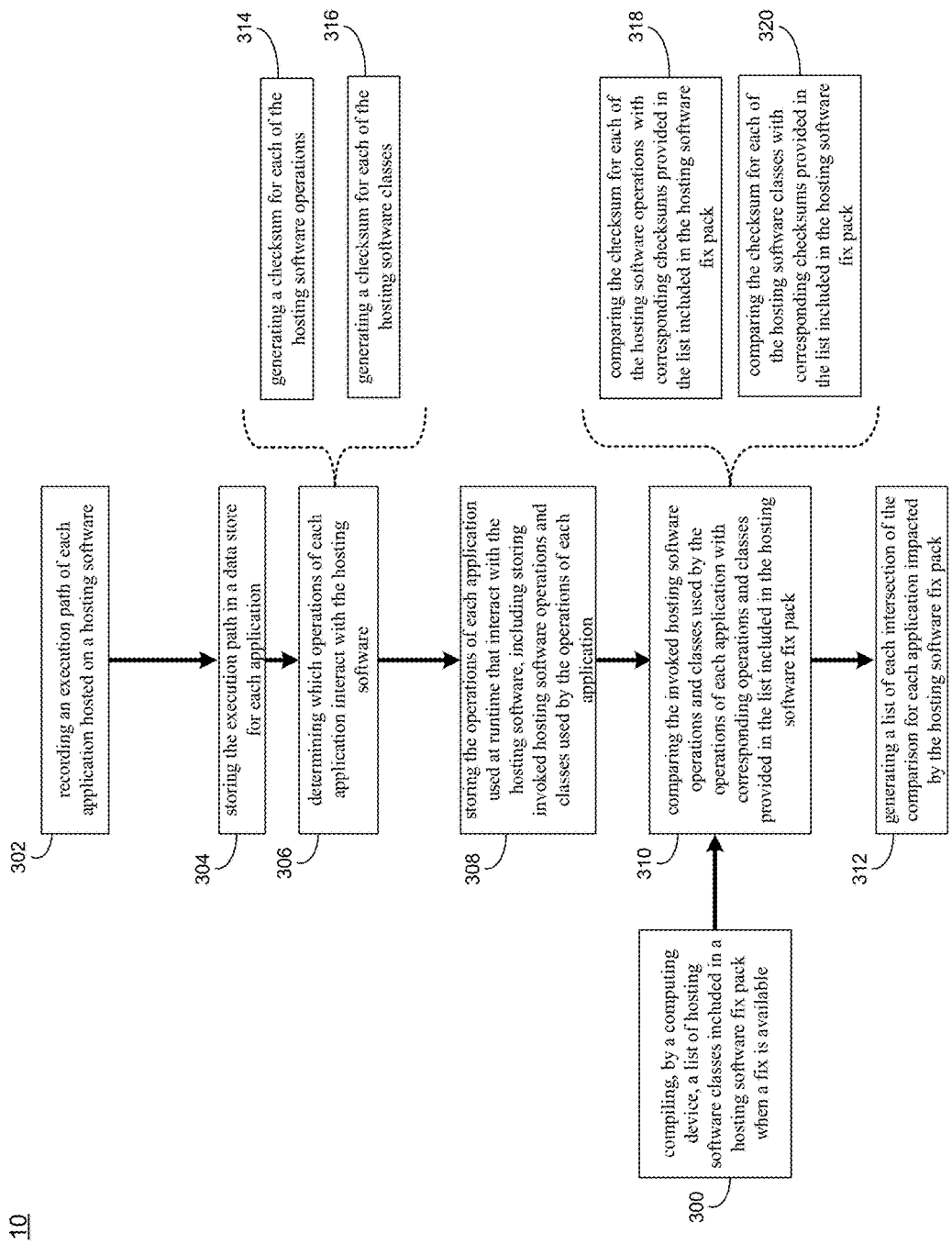
FIG. 3 is an example flowchart of the relevance process of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, relevance process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Relevance Process:

As discussed above and referring also at least to FIGS. 3-7, relevance process 10 may compile 300, by a computing device, a list of hosting software classes included in the hosting software fix pack when a fix is available. An execution path of each application hosted on a hosting software may be recorded 302 by relevance process 10. The execution path may be stored 304 by relevance process 10 in a data store for each application. Relevance process 10 may determine 306 which operations of each application interact with the hosting software. The operations of each application used at runtime that interact with the hosting software may be stored 308 by relevance process 10, including storing invoked hosting software operations and classes used by the operations of each application. The invoked hosting software operations and classes used by the operations of each application may be compared 310 by relevance process 10 with corresponding operations and classes provided in the list included in the hosting software fix pack. A list of each intersection of the comparison for each application impacted by the hosting software fix pack may be generated 312 by relevance process 10.

Some example software, such as Web Sphere Application Server, may be designed to host and run applications (e.g., business applications). These applications may manifest technical problems that may be caused by the hosting software itself. The lifecycle of the hosting software may often involve many major and minor fixes to various problems.

Customers of the hosting software may be required to apply a given fix in some test environments and run various tests before applying the fix in production. For example, a customer may be told to apply some fix to address a particular application problem. However, if the customer is not having a particular issue with an application, they may be reluctant to apply a fix pack to the hosting software because they may worry about having to perform regression-testing for all applications running in that host. These activities may be time-consuming and may cause customer satisfaction issues if the fix is irrelevant to a particular application problem. Additionally, some customers may run their applications in a hosting software that has fallen out of support. It may be beneficial to determine whether a fix applied to the hosting software is relevant to the application problem used by the customer. Thus, relevance process 10 may be used to identify impacted applications by a fix to the hosting software environment. Considering an application problem caused by a bug in the underlying software host, relevance process 10 may validate that a fix provided by the software host vendor indeed addresses that problem. Relevance process 10 may list applications that are impacted by a given fix to the underlying software host.

As will be discussed in greater detail below, relevance process 10 may identify whether a hosting software fix is relevant to a particular application and/or may identify which application is impacted by a hosting software fix. For instance, relevance process 10 may build a list of the hosting software classes involved in a given fix pack, record the execution path of an application and store the execution path in a data store, analyze which application operations interact with the underlying hosting software and store touch points (i.e., classes interacted with) in a data store for analysis, compare the above results and determine the intersection of the two, effectively letting one know if an application will be effected by a given fix pack or if the fix pack is relevant. For instance, as will be discussed below, as the various applications execute in the hosting software, relevance process 10 may records the execution paths. When applying a fix to the hosting software, relevance process 10 may look into the fix and the execution paths recorded for the environment. Using both sets of data (e.g., the fix details and the execution paths), relevance process 10 may provide an output for the impacted application operations and the specific underlying host code that is impacted by the fix. This identification may help customers plan to run validation tests for only the impacted operations as opposed to all operations. Additionally, using both sets of data, relevance process 10 may be able to tell whether the fix is relevant to a particular problem from which an application may be suffering.

In some implementations, relevance process 10 may compile 300, by a computing device, a list of hosting software classes included in the hosting software fix pack when a fix is available. An execution path of each application hosted on a hosting software may be recorded 302 by relevance process 10. For instance, relevance process 10 may record 302 the execution of each application operation. Recording 302 may be done in such a way that it may specify some or all the classes and methods involved in the execution of a given application operation. Some of these classes/operations may belong to the application domain and some may belong to the underlying hosting software. This recording 302 may be beneficial, as much of the underlying hosting software may not be used at runtime at all. Some fixes may be designed to update a portion of the hosting software that is not used by the application.

Before a fix is applied to the hosting software, the fix may be passed to relevance process 10 (e.g., via hosting application 20) that may be used to determine if the fix would impact any application at all. For example, relevance process 10 may query the fix to get, e.g., packages, classes, operations, or other relevant data. As will be discussed in greater detail below, relevance process 10 may compare and match those with the execution data. From this matching, if any, relevance process 10 may list, if any, all the applications that may be impacted by this fix.

In some implementations, there may be certain updates to the hosting software (e.g., hosting application 20) that may impact all applications even if the execution has not been recorded. For example, an application deployment process and/or class loaders (e.g., associated with relevance process 10) may be used to deploy and load the application parts. A fix may be supplied to update only the deployment process and/or the class loaders. In this case, all applications may be impacted in the deployment and loading phases which may also impact the runtime behavior of the applications.

For example, as the application executes a request, an interpreter (e.g., associated with hosting application 20) may pass the execution path to relevance process 10 along with the application names and checksums. For example, relevance process 10 may receive the following example input data:

```
<AppName name="App1">
<operation name="com.company.app1.class1.method1">
<checksums class="102" operation="95"/>
</operation>
<operation name="com.ibm.ws.class1.method1">
<checksums class="105" operation="80"/>
</operation>
<operation name="com.ibm.ws.class1.method2">
<checksums class="152" operation="105"/>
</operation>
</AppName>
```

In some implementations, the execution path may be stored 304 by relevance process 10 in a data store for each application. For instance, relevance process 10 may parses this execution path along with the application name and checksums, and may store them in a storage area such as the above-noted data store. When a fix is provided, a fix installer (e.g., associated with hosting application 20) may pass packages and corresponding classes to relevance process 10 to check the relevance of this fix to the installed application. An example of the input in this case may be:

```
<operation name="com.company.app1.class1.method1">
  <checksums class="102" operation="95"/>
</operation>
```

As will be discussed in greater detail below, relevance process 10 may check for a match on the package, class and method (e.g., operation). If there is a match on package, class and method, a check on method and class checksums may be performed by relevance process 10. If the checksums are the same, then the fix may not have changed this particular class and method, which may be indicative that the corresponding part of the execution path is not impacted by the fix. If the checksum of a method is different, then the execution path may be impacted. If the checksum of a class is different, then the execution path may be impacted. Once relevance process 10 identifies the impacted execution paths, relevance process 10 may identify the corresponding applications that are impacted by this software fix, thereby informing users whether or not the fix needs to be applied.

In some implementations, as noted above, and referring at least to FIGS. 4-7, relevance process 10 may determine 306 which operations of each application interact with the hosting software, and the operations of each application used at runtime that interact with the hosting software may be stored 308 by relevance process 10, including storing invoked hosting software operations and classes used by the operations of each application.

Figure 4:
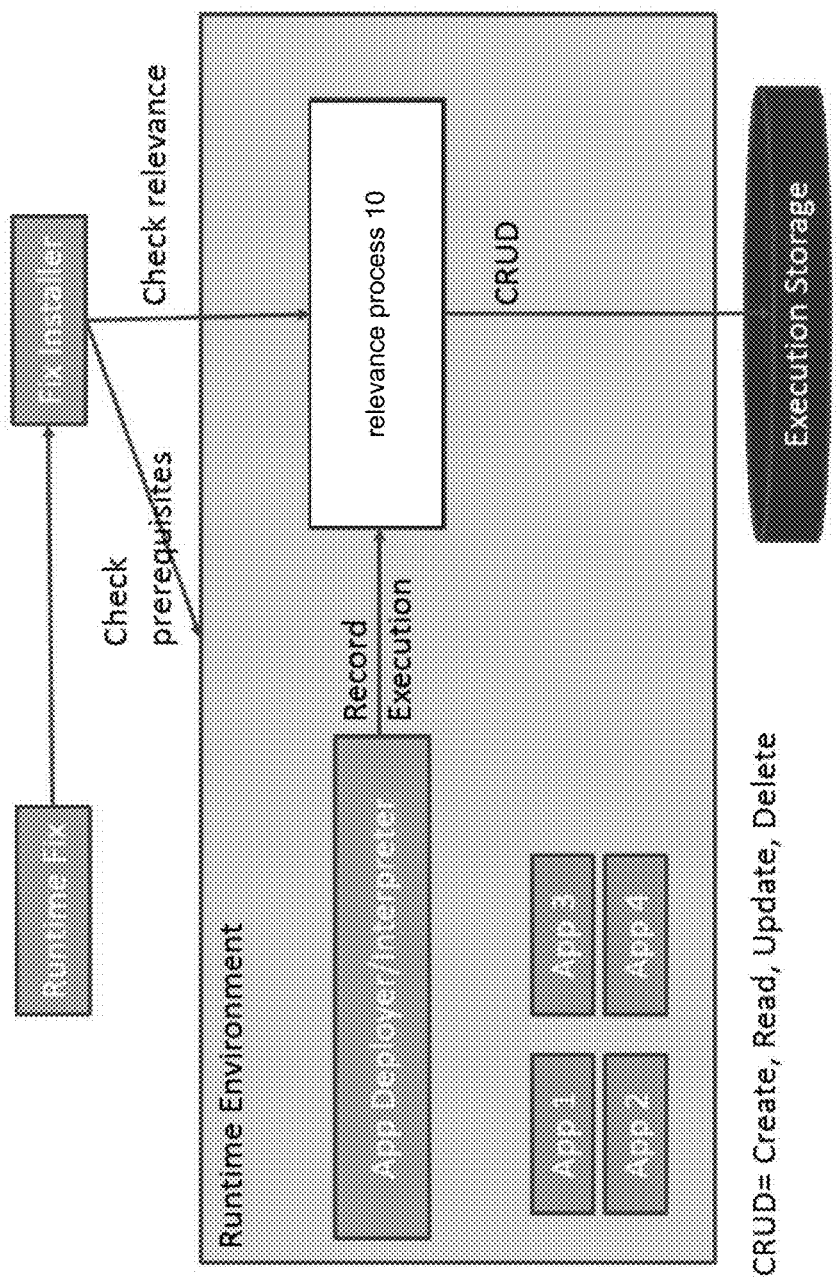
FIG. 4 is an example hosting software environment of applications according to one or more example implementations of the disclosure.

For example, and referring at least to the software host environment 400 of FIG. 4, classes may be loaded when they are referenced by an application class that is being loaded. For example, a servlet is loaded (if not loaded already), when an HTTP request targets it. All other classes (e.g., application or hosting software ones) that may be required by the "service" method may be loaded as well. The loaded classes, including the exact packages, may be readily available through the above-noted class loaders (e.g., associated with hosting application 20). In some implementations, relevance process 10 may receive this information fed from the class loaders.

In some implementations, class-loading described above may only indicate what the loaded classes are; however, it may indicate which method/operation is invoked for a particular request. The specific method invocation in a particular loaded class is readily available through the Java interpreter component. In some implementations, relevance process 10 may receive this information fed from the above-noted interpreter (e.g., associated with hosting application 20).

In some implementations, determining 306 which operations of each application interact with the hosting software may include generating 314 a checksum for each of the hosting software operations, and determining 306 which operations of each application interact with the hosting software may include generating 316 a checksum for each of the hosting software classes. As the fix may be for the hosting software (and not necessarily for the application), the checksums may be used to check whether a hosting software class/operation used by (e.g., interacted with) an application has been modified. For example, in some implementations, there may be a checksum for each class and method required to execute a request. The checksum may be computed by the above-noted interpreter. For instance, the interpreter may know which method of which class is being executed. The interpreter may computes the checksums for the class and the method being executed and relevance process 10 may receive this information fed from the interpreter.

Figure 5:
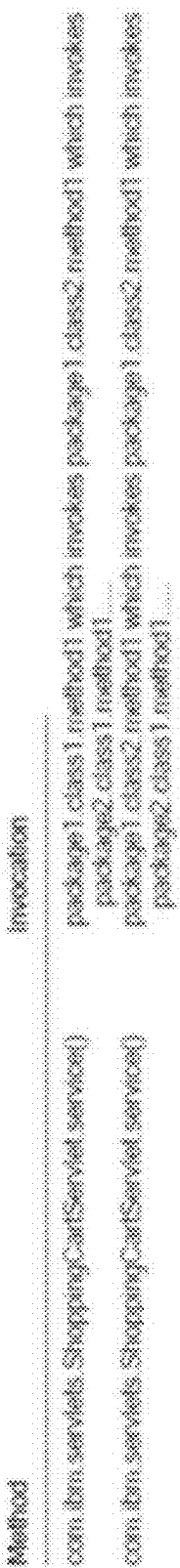
FIG. 5 is an example correspondence of methods and execution paths according to one or more example implementations of the disclosure.

In some implementations, and referring at least to FIG. 5, the execution path may include a map of each method and corresponding execution path. For instance, the map may be a one-to-many relationship. In some implementations, and referring at least to FIG. 6, the execution path may include a map of each class and corresponding checksum. In some implementations, the checksum of each class and method in a particular fix may be received by relevance process 10 (e.g., via hosting application 20). In some implementations, relevance process 10 may receive this information fed from, e.g., a fix installation wizard (e.g., associated with hosting application 20). An example of fix classes, methods and corresponding checksums is shown by example in the above-noted FIG. 6.

In some implementations, the invoked hosting software operations and classes used by the operations of each application may be compared 310 by relevance process 10 with corresponding operations and classes provided in the list included in the hosting software fix pack. In some implementations, comparing 310 may include comparing 318 the checksum for each of the hosting software operations with corresponding checksums provided in the list included in the hosting software fix pack, and comparing 310 may include comparing 320 the checksum for each of the hosting software classes with corresponding checksums provided in the list included in the hosting software fix pack. For example, relevance process 10 may query the execution path storage for each method and class, qualified by, e.g., package name, found in the fix.

In some implementations, if method is found in storage by relevance process 10, relevance process 10 may check the method checksum. In the example, if the checksum of the method in the fix equals the checksum of the method found in the execution path storage, then that method was not modified even though it is provided in the fix. However, if the checksums are not equal, then relevance process 10 may query the execution path storage for all applications that were impacted by the new method (in the fix).

In some implementations, if neither the method nor the class in the fix is found in the execution path storage, that may be indicative that the fix class and method are irrelevant to the deployed applications. In some implementations, relevance process 10 may continue to search for other methods and classes found in the fix.

In some implementations, if the method checksum in the fix is equal to the method checksum in the execution path storage, the class checksum may be checked by relevance process 10. For instance, it may be possible that the method in the fix was not changed, but the corresponding class was. If the class checksum in the fix is different from the class checksum in execution path storage, it may be possible that the new class is relevant. As such, the execution path storage may be queried for all applications that may be impacted by the new class.

In some implementations, a list of each intersection of the comparison for each application impacted by the hosting software fix pack may be generated 312 by relevance process 10. For instance, as will be discussed in greater detail, if the invoked hosting software classes/operations match the classes/operations found in the fix, then relevance process 10 may identify what hosting software class/operation has changed, which may identify which application may be impacted by the change. In the example, if a hosting software class or operation has changed because the checksum of the corresponding class or operation in the fix is different, the list of impacted applications may then be identified and generated 312 in the list.

Figure 7:
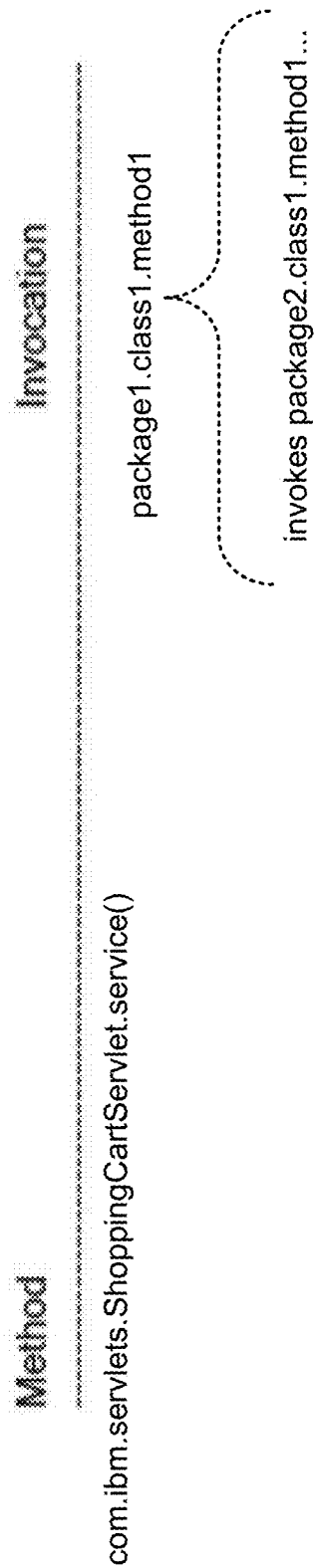
FIG. 7 is an example of execution path storage information according to one or more example implementations of the disclosure.

An example of the identification of the affected applications may be explained by example execution path storage of FIG. 7. Given the execution path storage information provided in FIG. 7, "package1.class1.method1" may invokes "package2.class1.method1 . . . " and "package1.class1.method1" may be provided in the fix, which in the example has a different checksum than what is in the execution path storage. Assume for example purposes only that, after, method1 was changed and the servlet com.ibm.servlets.ShoppingCartServlet, but more specifically, the service( ) method, is impacted and the fix is quite relevant. As such, it would be included as an intersection in the list generated 312 by relevance process 10. In some implementations, relevance process 10 may be incorporated in the above-noted software host environment 400, where an administrator may manually (and/or automatically) run it against a software host fix to generate 312 the list of affected hosted applications by this fix. In some implementations, this may be done before the fix is applied. As an example result, the list of affected customer applications may be provided to the stakeholders who may select which applications may need to be tested (e.g., those application on the generated 312 list), rather than having to test each application even if not affected by the fix. Put another way, the stakeholders may use the list to know which operation in a given application is impacted, and hence, should be tested.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
compiling, by a computing device, a list of hosting software classes included in a hosting software fix pack when a fix is available;
recording an execution path of each application hosted on a hosting software associated with the hosting software fix pack;
storing the execution path in a data store for each application;
determining which operations of each application interact with the hosting software, wherein determining which operations of each application interact with the hosting software includes generating a checksum for each of the hosting software operations and a checksum for each of the hosting software classes in the execution path;
storing the operations of each application used at runtime that interact with the hosting software, including storing invoked hosting software operations and classes used by the operations of each application;
comparing the invoked hosting software operations and classes used by the operations of each application with corresponding operations and classes provided in the list included in the hosting software fix pack, wherein comparing the invoked hosting software operations and classes includes, comparing the checksum for each of the hosting software operations in the execution path and the checksum for each of the hosting software classes with corresponding checksums provided in the list included in the hosting software fix pack, and upon determining the checksum for each of the hosting software classes in the hosting software fix pack are not equal to the checksum for each of the hosting software classes in the execution path, querying the execution path for each application impacted by a new class; and
generating a list of each intersection of the comparison for each application impacted by the hosting software fix pack.

2. The computer-implemented method of claim 1 wherein the execution path includes a map of each method and corresponding execution path.

3. The computer-implemented method of claim 1 wherein the execution path includes a map of each class and corresponding checksum.

4. A computer program product residing on a non-transitory computer readable storage medium having a plurality of instructions stored thereon which, when executed by a processor, cause the processor to perform operations comprising:
compiling a list of hosting software classes included in a hosting software fix pack when a fix is available;
recording an execution path of each application hosted on a hosting software associated with the hosting software fix pack;
storing the execution path in a data store for each application;
determining which operations of each application interact with the hosting software, wherein determining which operations of each application interact with the hosting software includes generating a checksum for each of the hosting software operations and a checksum for each of the hosting software classes in the execution path;

storing the operations of each application used at runtime that interact with the hosting software, including storing invoked hosting software operations and classes used by the operations of each application;

comparing the invoked hosting software operations and classes used by the operations of each application with corresponding operations and classes provided in the list included in the hosting software fix pack, wherein comparing the invoked hosting software operations and classes includes, comparing the checksum for each of the hosting software operations in the execution path and the checksum for each of the hosting software classes with corresponding checksums provided in the list included in the hosting software fix pack, and upon determining the checksum for each of the hosting software classes in the hosting software fix pack are not equal to the checksum for each of the hosting software classes in the execution path, querying the execution path for each application impacted by a new class; and generating a list of each intersection of the comparison for each application impacted by the hosting software fix pack.

5. The computer program product of claim 4 wherein the execution path includes a map of each method and corresponding execution path.

6. The computer program product of claim 4 wherein the execution path includes a map of each class and corresponding checksum.

7. A computing system including a processor and a memory configured to perform operations comprising:

compiling a list of hosting software classes included in a hosting software fix pack when a fix is available;

recording an execution path of each application hosted on a hosting software associated with the hosting software fix pack;

storing the execution path in a data store for each application;

determining which operations of each application interact with the hosting software, wherein determining which operations of each application interact with the hosting software includes generating a checksum for each of the hosting software operations and a checksum for each of the hosting software classes in the execution path;

storing the operations of each application used at runtime that interact with the hosting software, including storing invoked hosting software operations and classes used by the operations of each application;

comparing the invoked hosting software operations and classes used by the operations of each application with corresponding operations and classes provided in the list included in the hosting software fix pack, wherein comparing the invoked hosting software operations and classes includes, comparing the checksum for each of the hosting software operations in the execution path and the checksum for each of the hosting software classes with corresponding checksums provided in the list included in the hosting software fix pack, and upon determining the checksum for each of the hosting software classes in the hosting software fix pack are not equal to the checksum for each of the hosting software classes in the execution path, querying the execution path for each application impacted by a new class; and generating a list of each intersection of the comparison for each application impacted by the hosting software fix pack.

8. The computing system of claim 7 wherein the execution path includes a map of each method and corresponding execution path.

* * * * *